3,136,800
METHOD FOR PRODUCING HYDROXYTHIO-
BENZOIC ACIDS AND ESTERS THEREOF
Daniel W. Grisley, Jr., Dayton, Ohio, assignor to Monsanto Company, St. Louis, Mo., a corporation of Delaware
No Drawing. Filed Feb. 5, 1960, Ser. No. 6,846
15 Claims. (Cl. 260—455)

This invention relates to hydroxythiobenzoic acids and esters thereof. In one aspect, this invention relates to methods for producing the hydroxythiobenzoic acids. In another aspect, this invention relates to methods for producing the alkyl and aralkyl esters of the hydroxythiobenzoic acids. In another aspect, this invention relates to the alkyl and aralkyl esters of the hydroxythiobenzoic acids as new compounds.

The reaction of the aryloxide salt with carbonyl sulfide, followed by reaction with an alkylating agent, to form an S-alkyl-O-aryl-thiolcarbonate is disclosed and claimed in my copending application Serial No. 857,505, filed December 7, 1959. In that application, the reaction between the aryloxide salt and the carbonyl sulfide is carried out at a temperature below 100° C. wherein the

group adds onto the oxygen atom of the aryl-oxide salt to form a thiolcarbonate salt of the formula

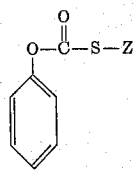

wherein Z is a salt-forming cation.

I have now discovered that an entirely different reaction can be effected by raising the temperature of a reaction mixture containing an aryloxide salt and carbonyl sulfide to at least 125° C. to effect substitution of the

group on a carbon atom of the phenyl ring, instead of on the oxygen atom of the aryloxide salt, thereby forming a hydroxythiobenzoate salt more fully identified hereinafter.

An object of this invention is to prepare the hydroxythiobenzoate salts from aryloxide salts and carbonyl sulfide.

Another object of this invention is to provide a process for preparing the hydroxythiobenzoic acids in a simple and direct manner from readily available reactants.

Another object of this invention is to provide a process for preparing the alkyl and aralkyl esters of the hydroxybenzoic acids from an aryloxide salt, carbonyl sulfide, and an alkylating agent.

Another object of this invention is to provide the alkyl and aralkyl esters of the hydroxythiobenzoic acids as new compounds.

Other aspects, objects and advantages of this invention are apparent from a consideration of the accompanying disclosure and the appended claims.

According to the present invention, aryloxide salts are interacted with carbonyl sulfide under anhydrous conditions at a temperature above 125° C. to form a hydroxythiobenzoate salt as illustrated by the following equation:

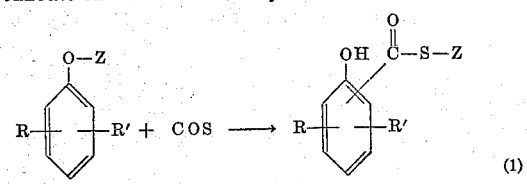

(1)

wherein R and R' are selected from the group consisting of hydrogen and alkyl radicals, R and R' being either the same or different, and Z is a salt-forming cation selected from the group consisting of alkali metal, alkaline earth metal, and quaternary ammonium cations. The resulting hydroxythiobenzoate salt is then interacted with an alkylating agent to form an ester of hydroxythiobenzoic acid as illustrated by the following equation:

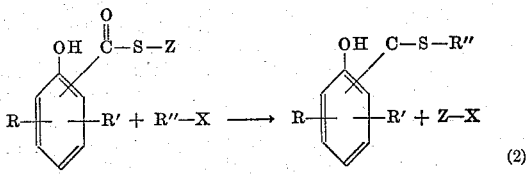

(2)

wherein R" is selected from the group consisting of alkyl and aralkyl radicals and X is an easily replaceable group.

Further, according to the present invention, the hydroxythiobenzoate salts obtained above are interacted with a mineral acid to form a hydroxythiobenzoic acid as illustrated by the following equation:

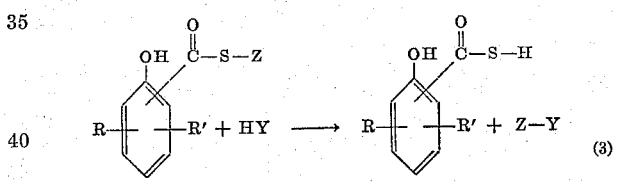

(3)

wherein Y is an acid anion of a mineral acid.

Also, according to the present invention, there are provided as new compounds, hydroxythiobenzoic acid esters of the formula

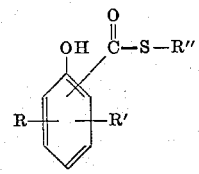

wherein R, R', and R" are as above defined.

The aryloxide salt reactants employed in the process of this invention are preferably the alkali metal, alkaline earth metal or quaternary ammonium phenoxides of the formula

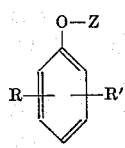

wherein Z is represented by the alkali metal, alkaline earth metal or quaternary ammonium cation. The useful metals are sodium, potassium, and lithium whereas the useful alkaline earth cations include magnesium, calcium, barium and strontium. Examples of the quaternary ammonium cations include tetramethyl ammonium and trimethyl benzyl ammonium cations obtained from the corresponding hydroxides. Preferably, the salt-forming cation is an alkali metal because the alkaline earth and quaternary ammonium cations produce products which are not so readily separated as the products formed using the alkali metal cations.

R and R′ of the aryloxide salt reactant can be either the same or different hydrogen or alkyl radicals, preferably, an alkyl radical having less than 12 carbon atoms. Examples of suitable alkyl radicals include methyl, ethyl, propyl, isopropyl, butyl, pentyl, hexyl, octyl, nonyl, and the like. A preferred aryloxide salt reactant is sodium phenoxide.

Methods for the preparation of the aryloxide salts are well known to those skilled in the art. For example, the sodium phenoxide can be readily prepared by heating a mixture of sodium and phenol in a dry atmosphere in the presence of a solvent such as diethyl Carbitol until the sodium has completely reacted.

The alkylating agent, R″—X, can be either an alkyl or an aralkyl alkylating agent having a replaceable group represented by X. Suitable replaceable groups include the halides, such as chloride, bromide, or iodide; the sulfates; or the sulfonates. Preferably, the alkyl and aralkyl radicals contain less than 14 carbon atoms; however, alkyl and aralkyl radicals having more than 14 carbon atoms can also be used since the reaction of this invention is not dependent upon the number of carbon atoms in these radicals but is determined solely by the nature of the functional groups. Examples of suitable alkylating agents include methyl iodide, propyl chloride, hexyl bromide, methyl sulfate, nonyl sulfate, benzyl sulfonate, and the like. Methyl iodide is a preferred alkylating agent.

Reaction of the aryloxide salt with the carbonyl sulfide to form the hydroxythiobenzoate salt requires the use of elevated temperature and pressure as contrasted with the reaction of the same reactants disclosed in the above-identified application to form the thiolcarbonates utilizing room temperature and atmospheric pressure. Thus, in conducting the process of this invention to form the hydroxythiobenzoate salt, the temperature is maintained above 125° C. in order to minimize the formation of the thiolcarbonate salt. Usually the temperature is maintained below 180° C. because the hydroxythiobenzoate salt tends to decompose at higher temperatures. However, somewhat higher temperatures can be used if the pressure maintained on the reaction mixture is raised above the pressure usually employed. Usually the pressure is maintained above 100 p.s.i.g. and a pressure as high as 1000 p.s.i.g. can be used if desired. If the reaction is conducted in the presence of an inert solvent or diluent, a lower pressure can be used than when the reaction is conducted in the absence of a solvent. Preferably, the pressure is maintained above 200 p.s.i.g. when a solvent is not employed.

The reaction of this invention wherein aryloxide salt is reacted with carbonyl sulfide to form a hydroxythiobenzoate salt can be carried out either in the presence or the absence of a solvent or inert diluent. Preferably, the reaction is carried out in the absence of a solvent because somewhat higher yields are obtained. However, since lower pressures can be used in the presence of a solvent, it is sometimes desirable to have a solvent present in the reaction mixture. Preferably, the solvent is one in which the aryloxide salt is soluble; however, it can less desirably be one in which aryloxide salt is only partially soluble but suspended therein. Examples of some suitable solvents include diethyl Carbitol, dimethyl Carbitol, xylene, and the like. The amount of solvent used in conducting the reaction is not critical so long as there is sufficient solvent to maintain most of the aryloxide salt in solution. In either case, whether or not a solvent is used, it is absolutely necessary that anhydrous reaction conditions be maintained since the aryloxide salt reverts back to the phenol in the presence of carbonyl sulfide in water. For this reason, formation of the hydroxythiobenzoate salt cannot be accomplished by reacting the carbonyl sulfide with sodium hydroxide and phenol instead of reacting the carbonyl sulfide with the aryloxide salt.

The aryloxide salt and the carbonyl sulfide are preferably reacted using an excess of the carbonyl sulfide to form the hydroxythiobenzoate salt; however, stoichiometric proportions of the aryloxide salt and the carbonyl sulfide can less desirably be used. It is not ordinarily desirable to use an excess of the aryloxide salt because the presence of an excess of this reactant in the reaction zone usually results in the formation of undesired side-reaction products. Ordinarily, the proportion of carbonyl sulfide to aryloxide salt maintained in the reaction zone is within the range of from 1:1 to 100:1.

The reaction of the aryloxide salt with the carbonyl sulfide at elevated temperatures is primarily an addition type reaction resulting in the formation of the hydroxythiobenzoate salt as a single product comprising both the ortho and para isomers. If desired, the para and ortho isomers of the hydroxythiobenzoate salt can be readily separated by precipitation of para isomer by addition of diethyl ether to the diethyl Carbitol in which the ortho isomer is soluble; however, it is usually advantageous to effect such separation after the hydroxythiobenzoate salt has been converted into either the ester or the acid. Therefore, it is not ordinarily necessary to purify the hydroxythiobenzoate salt prior to conversion to one of these other products.

The reaction of the hydroxythiobenzoate salt with the alkylating agent as shown in Equation 2 is carried out in a solvent or inert diluent medium at a lower temperature than is used in the first reaction step. The temperature must be maintained within the range of from 0° C. to 75° C. and preferably is maintained at room temperature or lower. The solvent or inert diluent may be the same as that used in reacting the aryloxide salt and the carbonyl sulfide and, where a solvent was used in the first reaction step, no additional solvent is necessary in conducting the alkylation reaction. However, where the aryloxide salt and the carbonyl sulfide were reacted in the absence of a solvent, it is necessary that the solvent be added to the hydroxythiobenzoate salt prior to reaction with the alkylating agent. The alkylation step may be carried out at atmospheric pressure although it is sometimes desirable to carry out this step at a pressure as high as 200 p.s.i.g. A catalyst is not required in conducting the alkylation. Although the alkylation can be conducted using a stoichiometric proportion of the alkylating agent, it is usually desirable to use an excess of the alkylating agent.

The hydroxythiobenzoic acid esters are very readily recovered from the alkylation reaction mixture by dissolving the unconverted reactants in water and extracting with toluene in which both the ortho and para isomers of the hydroxythiobenzoic acid esters are soluble. After evaporation of the toluene, the ortho and para isomers may be readily separated by distillation according to procedures well known to those skilled in the art.

The hydroxythiobenzoic acid esters of this invention are usually fairly low-boiling liquids which are generally insoluble in water but soluble in most organic solvents. Illustrative examples of some hydroxythiobenzoic acid esters of this invention include:

S-methyl-2-hydroxythiobenzoate
S-methyl-4-hydroxythiobenzoate
S-propyl-2-hydroxythiobenzoate
S-hexyl-4-hydroxythiobenzoate
S-methyl-2-hydroxy-3-methyl-thiobenzoate
S-octyl-4-hydroxy-3,5-dimethyl-thiobenzoate
S-butyl-2-hydroxy-5-butyl-thiobenzoate
S-ethyl-2-hydroxy-3,5-dimethyl-thiobenzoate These thioesters are particularly useful as plasticizing and modifying agents for synthetic and natural rubbers, resins, and polymeric materials and as biological toxicants, particularly as nematocides. These thioesters are also useful as intermediates in the preparation of many other valuable compounds, particularly compounds which are useful as pharmaceuticals. For example, hydroxythiobenzoic acid esters can be reacted with amines to form salicylic amides or with alcohols to form esters. Also, the hydroxyl group can be alkylated with an alkyl halide or sulfate to form an ether.

The hydroxythiobenzoate salt is readily converted into the corresponding hydroxythiobenzoic acid by acidifying an aqueous solution of the hydroxythiobenzoate salt with a mineral acid, such as hydrochloric acid, sulfuric acid, phosphoric acid, and hydrobromic acid. Depending upon the solvent used in the formation of the hydroxythiobenzoate salt, a separation of the ortho and para isomers can be effected at this point with the diethyl ether. That is, the para isomer of hydroxythiobenzoate salt is substantially insoluble in a diethyl ether/diethyl Carbitol solution whereas the ortho derivative is substantially soluble in this mixture of solvents and a separation of these isomers can be effected. It is not necessary to effect separation of the ortho and para isomers before conversion to the acids because the ortho and para hydroxythiobenzoic acids have widely separated melting points and solubilities, thereby affording a means of separation.

It is very advantageous to use water as a solvent in conversion of the hydroxythiobenzoate salt to the corresponding acid since both the ortho and para forms of the salt, as well as the common mineral acids, are soluble in water and the hydroxythiobenzoic acid products are insoluble therein. The addition of the mineral acids to the hydroxythiobenzoate salt must be carried out at relatively low temperature preferably within the range of from $-20$ to $+5°$ C., because the hydroxythiobenzoic acids are readily hydrolyzed by the mineral acid to hydrogen sulfide and a carboxylic acid. The mineral acid is added in excess but the hydrogen ion equivalent is usually less than twice the amount required. Advantageously, sufficient mineral acid is added to obtain a pH in the reaction mixture of 2.

The hydroxythiobenzoic acids are readily separated from the aqueous reaction mixture since these acids are insoluble in water, existing as oily liquids therein. Advantageously, the acids are recovered by extraction with diethyl ether and evaporation of the ether to leave the solid hydroxythiobenzoic acid. Ordinarily, further purification of the acid is necessary in order to obtain a relatively pure compound.

The hydroxythiobenzoic acid products of this invention are generally solid materials having relatively low melting points. Both the ortho and para isomers are generally soluble in the usual organic solvents such as diethyl ether, xylene, hexane, and the like, but insoluble in water. Illustrative examples of some hydroxythiobenzoic acids formed in the process of this invention include:

2-hydroxythiobenzoic acid
4-hydroxythiobenzoic acid
2-hydroxy-3,5-dimethyl-thiobenzoic acid
4-hydroxy-3,5-diethyl-thiobenzoic acid
2-hydroxy-5-hexyl-thiobenzoic acid
4-hydroxy-3-octyl-thiobenzoic acid In general, the hydroxythiobenzoic acids are useful as intermediates in the preparation of pharmaceutical compounds; 2-hydroxythiobenzoic acid is particularly useful for this purpose.

The advantages, desirability, and usefulness of the present invention are illustrated by the following examples.

*Example 1*

In this example, sodium phenoxide was reacted with carbonyl sulfide in the presence of a xylene solvent to obtain 2-hydroxythiobenzoic acid as product. Into a 1.4 liter autoclave was placed a mixture of 58 g. (0.5 mole) of sodium phenoxide and 400 ml. of xylene. After the autoclave was flushed with nitrogen, 113 g. (1.9 moles) of carbonyl sulfide was introduced into the mixture. The autoclave was then sealed and the reaction mixture heated with stirring at a temperature of 150° C. and a pressure of 140 p.s.i.g. for a period of 18 hours. At the end of this time, the reaction mixture was cooled to room temperature and the gases vented through a potassium hydroxide solution. The reaction mixture was then filtered to obtain the hydroxythiobenzoate sodium salt as a tan colored solid material which, after trituration with ether and drying at 50° C. under a pressure of 20 mm. Hg for a period of 2 hours, amounted to 42.4 g. The hydroxythiobenzoate sodium salt was dissolved in 200 ml. of water and acidified with dilute hydrochloric acid. The aqueous solution obtained was then extracted with diethyl ether to obtain an aqueous phase and an organic phase. The organic phase was dried over sodium sulfate and filtered. The filtrate obtained was evaporated at a temperature of 25° C. and a pressure of 20 mm. Hg to remove the diethyl ether and obtain a dark colored oil containing some solid crystals of bis-(O-hydroxybenzoyl)disulfide which were removed by filtration. The oil was then distilled to obtain 5.49 g. of the 2-hydroxythiobenzoic acid boiling at 60–62° C./0.4 mm. Hg and having a melting point of 33–35° C. Analysis of this product was found to be 54.30 wt. percent carbon, 3.82 wt. percent hydrogen, and 20.77 wt. percent sulfur as compared with calculated values of 54.52 wt. percent carbon, 3.92 wt. percent hydrogen, and 20.79 wt. percent sulfur. Structure of the 2-hydroxythiobenzoic acid was confirmed by an inspection of the infra-red spectrum of the compound.

*Example 2*

In this example, sodium phenoxide was reacted with carbonyl sulfide without the use of a solvent to form 2-hydroxythiobenzoic acid. The sodium phenoxide in an amount of 18.7 g. (0.16 mole) was placed in ten small trays fitted in a metal rack which was inserted into a 300 ml. autoclave. The autoclave was then evacuated to 0.1 mm. Hg and heated with a Bunsen burner over a period of 24 hours. Thereafter, 56 g. (0.93 mole) of carbonyl sulfide was distilled from a steel flask into the sealed autoclave. The autoclave was thereafter heated in a molten salt heating bath at a temperature of 135° C. for a period of 6 hours under a pressure of 750 p.s.i. At the end of this time, the autoclave was cooled overnight and the gases vented through an aqueous potassium hydroxide solution. The hydroxythiobenzoate sodium salt remaining in the autoclave amounted to 26.0 g. and was orange in color. This salt was triturated with diethyl ether and dried at a temperature of 25° C. and a pressure of 20 mm. Hg for a period of 12 hours to purify the product. In formation of the acid, 4.3 g. of the hydroxythiobenzoate sodium salt was dissolved in 25 ml. of water and the resulting solution contacted with cold concentrated hydrochloric acid in an amount sufficient to obtain a pH of 2. The hydroxythiobenzoic acid formed in the aqueous solution existed as an oil layer which was separated and recovered by extraction with two 50 ml. portions of diethyl ether. The ether solutions of the acid were then dried over sodium sulfate, filtered and evaporated to remove the diethyl ether and obtain 1.38 g. of a dark colored oil which was identified by infrared analysis as the 2-hydroxythiobenzoic acid.

*Example 3*

In this example, sodium phenoxide was reacted with carbonyl sulfide in a diethyl Carbitol solvent to obtain the hydroxythiobenzoate sodium salt which was then converted into the corresponding ortho and para hydroxythiobenzoic acids and recovered as the separate isomers. The sodium phenoxide was formed by heating a mixture of 12 g. (0.3 mole) of sodium hydroxide, 12 ml. of water, 28.2 g. (0.3 mole) of phenol, 300 ml. of diethyl Carbitol, and 400 ml. of toluene in a 1.4 liter bottom-stirred autoclave at a temperature of 160° C. under a nitrogen atmosphere. After formation of the sodium phenoxide was completed, the toluene and water were removed by distillation and carbonyl sulfide was pressured into the autoclave. The reaction mixture was then heated at a temperature of 167–170° C. for a period of 1 hour while maintaining the pressure at 95–130 p.s.i.g. At the end of this time, the autoclave was cooled to 40° C. and the gases vented through an aqueous potassium hydroxide solution. The reaction mixture contained some para hydroxythiobenzoate salt as a solid precipitate and the complete precipitation of this isomer was accomplished by the addition of diethyl ether to the reaction mixture. The ether solution of the reaction mixture was then filtered to obtain 13.4 g. of 4-hydroxythiobenzoate sodium salt which is a yellow colored solid. The filtrate from this filtration step contained the 2-hydroxythiobenzoate sodium salt in solution and this isomer was recovered by evaporation of the volatiles at a temperature of 100° C./1 mm. Hg to obtain 14.7 g. of the dark orange colored solid product.

The 4-hydroxythiobenzoic acid was obtained by acidifying 10 g. of the yellow colored salt obtained above as a precipitate in a saturated aqueous salt solution at a temperature of 0–10° C. with concentrated hydrochloric acid. The 4-hydroxythiobenzoic acid formed in the aqueous mixture as an oily layer which was recovered by extraction with 100 ml. of diethyl ether. This dark colored ether solution was then dried over magnesium sulfate, filtered, and evaporated under vacuum to obtain a black solid material which was triturated with 5% sodium bicarbonate solution. The triturate was separated from the residual solid by filtration, cooled to 0° C., and acidified with concentrated hydrochloric acid to obtain the 4-hydroxythiobenzoic acid in a pure form. The acid product was recovered from this solution by extraction with 100 ml. of diethyl ether. This ether solution was washed with water until neutral, dried over magnesium sulfate, filtered and evaporated under vacuum to obtain 2.13 g. of the 4-hydroxythiobenzoic acid which is a tan colored solid material having a melting point of 93–94° C. The structure of this compound was confirmed by an inspection of the infrared spectrum.

The 2-hydroxythiobenzoate sodium salt was converted into the corresponding acid by acidifying 10 g. of the dark orange colored solid residue obtained from the filtrate above in a saturated salt solution at 0–10° C. with HCl. The 2-hydroxythiobenzoic acid formed in the aqueous reaction mixture as an oily layer which was separated and recovered by extraction with 3–100 ml. portions of diethyl ether. The diethyl ether was removed by evacuation under vacuum to obtain a black oil which was then extracted with 200 ml. of a saturated sodium bicarbonate solution. The aqueous solution obtained was washed with ether and then cooled to 0° C. for a second acidification with concentrated hydrochloric acid to again form the 2-hydroxythiobenzoic acid as an oily layer. The acid product was again separated by extraction with 2–100 ml. portions of diethyl ether. The ether solutions were then dried over magnesium sulfate, filtered, and evaporated under vacuum to obtain a dark-red oil. Distillation of this oil gave 3.00 g. of 2-hydroxythiobenzoic acid as a distillate.

*Example 4*

In this example, S-methyl-2-hydroxythiobenzoate was prepared from sodium phenoxide and carbonyl sulfide followed by alkylation with methyl iodide. The sodium phenoxide was prepared by reacting 28.2 g. (0.3 mole) of phenol with 12 g. (0.3 mole) of sodium hydroxide containing 30 ml. of water and removing the water by azeotropic distillation with toluene. The sodium phenoxide was further purified in a bottom-stirred autoclave by the introduction of diethyl Carbitol and 100 ml. of toluene and further heating the autoclave to distill off the toluene and any water present under a nitrogen atmosphere. The autoclave was then sealed and carbonyl sulfide was pressured into the stirred mixture at a temperature of 140° C. and an initial pressure of 80 p.s.i.g. The reaction mixture was then heated for a period of 4 hours. At the end of this time, the reaction mixture was cooled to 70° C. and methyl iodide was pressured into the autoclave along with nitrogen. The reaction mixture was then cooled to room temperature in order to complete the alkylation reaction. The reaction mixture was removed from the autoclave by rinsing with two 200 ml. portions of water followed by 100 ml. of toluene. The organic layer formed was separated and washed with two 500 ml. portions of water, dried over magnesium sulfate, filtered, and evaporated to obtain a heavy oil. This oil was distilled to obtain a 21.5 g. fraction boiling at 88–120° C./1 mm. Hg. Upon redistillation of this fraction, 6.26 g. of S-methyl-2-hydroxythiobenzoate was obtained boiling at 74–76° C./0.05 mm. Hg and having a refractive index $n_D^{25}$ 1.5901. Analysis of this compound was found to be 57.81 wt. percent carbon, 5.16 wt. percent hydrogen, and 18.77 wt. percent sulfur as compared with calculated values of 57.12 wt. percent carbon, 4.79 wt. percent hydrogen and 19.06 wt. percent sulfur. The structure of this compound was confirmed by an analysis of the infrared spectrum.

Reasonable variation and modification of the invention as described are possible, the essence of which is that there have been provided (1) methods for preparing the alkyl and aralkyl esters of hydroxythiobenzoic acids by interacting an aryloxide salt with carbonyl sulfide at an elevated temperature and alkylating the resulting product, (2) methods for preparing the hydroxythiobenzoic acids by interacting an aryloxide salt with carbonyl sulfide at an elevated temperature and acidifying the resulting product with a mineral acid, and (3) the alkyl and aralkyl esters of the hydroxythiobenzoic acids as new compounds.

I claim:

1. The method which comprises reacting a phenoxide salt of the formula

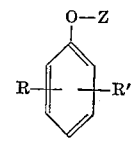

wherein R and R' are selected from the group consisting of hydrogen and alkyl radicals, each radical containing less than 12 carbon atoms, and Z is an alkali metal salt-forming cation, with carbonyl sulfide at an elevated temperature in the range of 125–180° C. and an elevated pressure of above 100 p.s.i.g. under anhydrous conditions to form a first reaction mixture containing a hydroxythiobenzoate salt of the formula

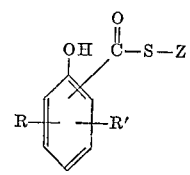

wherein R, R' and Z are as above defined, alkylating said first reaction mixture with an alkylating agent of the formula R''—X wherein R'' is selected from the group consisting of alkyl and aralkyl radicals containing less than 14 carbon atoms and X is a readily replaceable group, to form a second reaction mixture containing a thioester of the formula

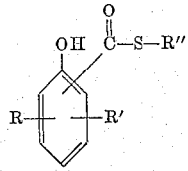

wherein R, R' and R'' are as above defined, and recovering from said second reaction mixture said thioester as product.

2. The method of claim 1, wherein alkylating said first reaction mixture is carried out at a temperature of from about 0° C. to about 75° C.

3. The method of claim 1 wherein said reacting of said phenoxide salt and said carbonyl sulfide is carried out in an inert reaction medium.

4. The method of claim 2, wherein the reaction of the alkali metal phenoxide with the carbonyl sulfide is carried out in an inert reaction medium consisting of diethyl Carbitol.

5. The method of claim 3 wherein said inert reaction medium is selected from the group consisting of dimethyl Carbitol, diethyl Carbitol, and xylene.

6. The method comprising reacting sodium phenoxide dissolved in diethyl Carbitol with carbonyl sulfide at a temperature in the range of 125–180° C. and a pressure above 100 p.s.i.g. under anhydrous conditions, alkylating the resulting reaction mixture with methyl iodide at a temperature within the range of 0–75° C., and recovering from the last resulting reaction mixture S-methyl-2-hydroxythiobenzoate as product.

7. The method which comprises reacting an alkali metal phenoxide salt with carbonyl sulfide at an elevated temperature in the range of 125–180° C. and an elevated pressure of above 100 p.s.i.g. under anhydrous conditions, acidifying an aqueous solution of the resulting reaction mixture with a mineral acid, and recovering from the last resulting reaction mixture a hydroxythiobenzoic acid as product.

8. The method which comprises reacting a phenoxide salt of the formula

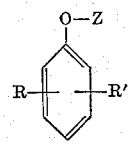

wherein R and R' are radicals of the formula $C_nH_{2n+1}-$, where $n$ is a cardinal from 0 to 11, and Z is an alkali metal salt-forming cation, with carbonyl sulfide at a temperature in the range of 125–180° C. and an elevated pressure of above 100 p.s.i.g. under anhydrous conditions to form a first reaction mixture containing a hydroxythiobenzoate salt of the formula

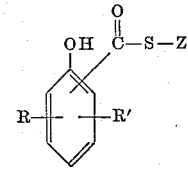

wherein R, R' and Z are as above defined, acidifying an aqueous solution of said hydroxythiobenzoate salt with a mineral acid to form a second reaction mixture containing a hydroxythiobenzoic acid of the formula

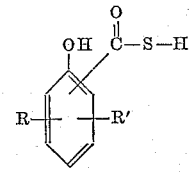

wherein R and R' are as above defined, and recovering from said second reaction mixture said hydroxythiobenzoic acid as product.

9. The method of claim 8, wherein the mineral acid is selected from the group consisting of hydrochloric, hydrobromic, sulfuric, and phosphoric acids.

10. The method of claim 9 wherein said reacting of said phenoxide salt and said carbonyl sulfide is carried out in an inert reaction medium.

11. The method of claim 9 wherein said salt-forming cation is sodium and the mineral acid is added in an amount to provide a hydrogen ion concentration of the order of about pH 2.

12. The method of claim 10 wherein said inert reaction medium is selected from the group consisting of dimethyl Carbitol, diethyl Carbitol, and xylene.

13. The method of claim 10 wherein said inert reaction medium is diethyl Carbitol.

14. The method comprising reacting sodium phenoxide with carbonyl sulfide at a temperature in the range of 125–180° C. and a pressure above 100 p.s.i.g. under anhydrous conditions, acidifying an aqueous solution of the resulting reaction mixture with hydrochloric acid at a temperature within the range of −20 to +5° C., and recovering from the last resulting reaction mixture a hydroxythiobenzoic acid.

15. The method comprising reacting sodium phenoxide dissolved in diethyl Carbitol with carbonyl sulfide at a temperature in the range of 125–180° C. and a pressure above 100 p.s.i.g. under anhydrous conditions, acidifying an aqueous solution of the resulting reaction mixture with hydrochloric acid at a temperature in the range of −20 to +5° C., and recovering from the last resulting reaction mixture a hydroxythiobenzoic acid.

References Cited in the file of this patent

UNITED STATES PATENTS 2,694,723 Schramm _____ Nov. 16, 1954
2,696,496 Craig et al. _____ Dec. 7, 1954

OTHER REFERENCES

Meyer et al.: "Lehrbuch der Organischen Chemie," 2, 2nd Edition (1913), pages 1364–1365

Whitmore: "Organic Chemistry," 2nd Edition (1951), pages 455–6.

Miyaki et al.: C.A., 50, 13808b (1956).